United States Patent [19]

Martinson

[11] 3,943,347

[45] Mar. 9, 1976

[54] DATA PROCESSOR REORDER RANDOM ACCESS MEMORY

[75] Inventor: Lloyd William Martinson, Haddonfield, N.J.

[73] Assignee: RCA Corporation, New York, N.Y.

[22] Filed: Nov. 27, 1974

[21] Appl. No.: 527,837

[52] U.S. Cl............................. 235/152; 340/172.5
[51] Int. Cl.².......................................... G06F 7/00
[58] Field of Search .......... 235/152, 156; 340/172.5

[56] References Cited
UNITED STATES PATENTS

| | | |
|---|---|---|
| 3,584,782 | 6/1971 | Bergland............................ 235/156 |
| 3,731,284 | 5/1973 | Thies............................... 340/172.5 |
| 3,781,822 | 12/1973 | Ahamed........................... 340/172.5 |
| 3,862,406 | 1/1975 | Brooks................................ 235/152 |

Primary Examiner—David H. Malzahn
Attorney, Agent, or Firm—Edward J. Norton; Carl M. Wright

[57] ABSTRACT

Random access memory addressing system for mapping data into a memory according to one schema and retrieving the stored data according to another schema using minimum storage locations.

3 Claims, 4 Drawing Figures

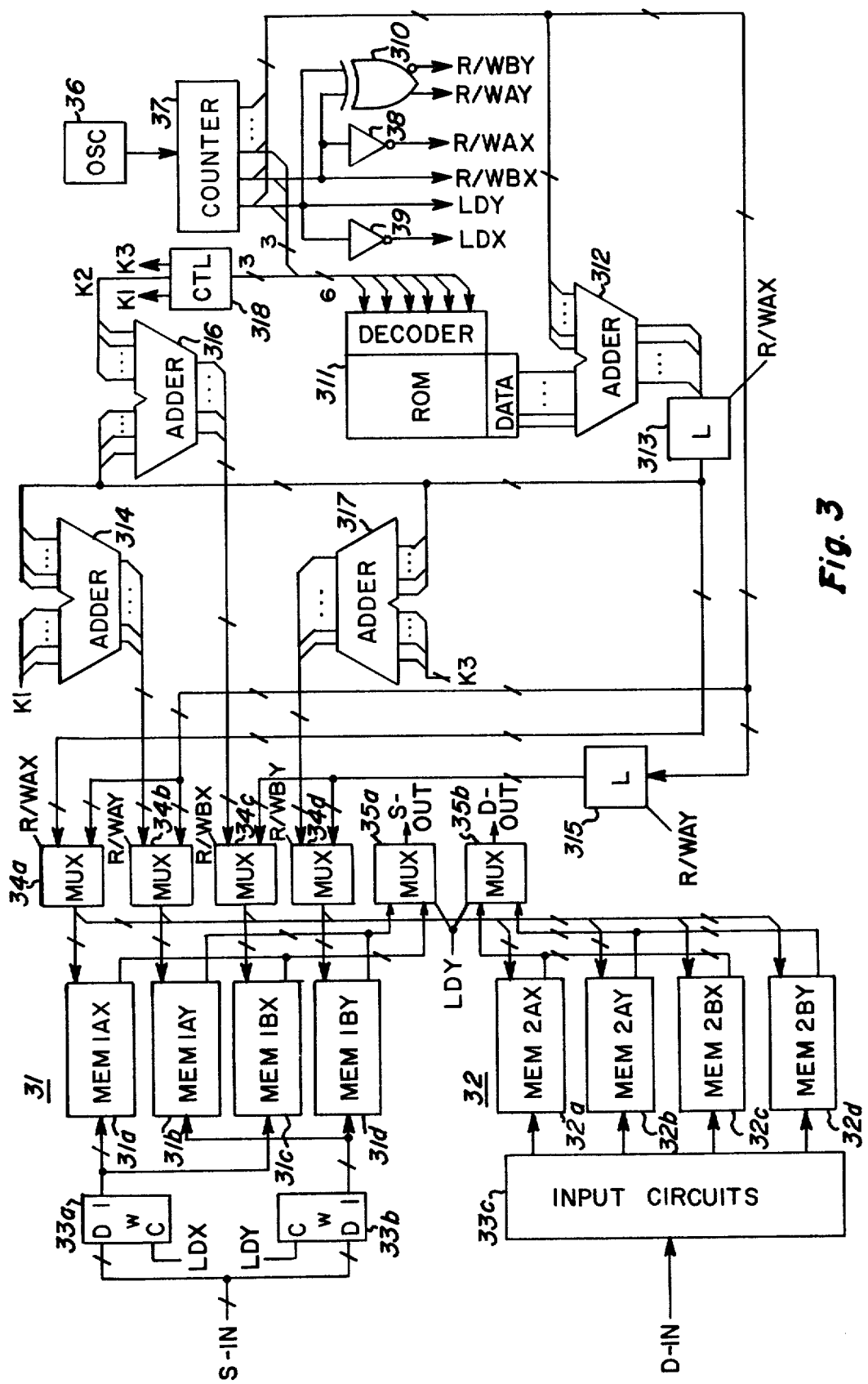

DATA PROCESSOR REORDER RANDOM ACCESS MEMORY

The invention herein described was made in the course of or under a contract or subcontract thereunder, with the Department of the Air Force.

BACKGROUND OF THE INVENTION

This invention relates to memory addressing systems for manipulating arrays.

Array manipulations are common in data processing. For example, the time serial output signals from processors, especially array processors, often require reordering. A specific example of such an arrangement is cascaded Fast Fourier Transform (FFT) processors, which are cascaded to provide coarse and fine resolutions of frequency coefficients extracted from sample data in frequency surveillance or "zoom" systems.

The output signals from a first FFT processor are in bit-reversed order and are usually reordered for several reasons. For instance, in a step transform system, the successive output signals from the first FFT processor are processed diagonally by the second FFT processor. That is, the second FFT processor input signals are the first frequency coefficient in the first time frame, the second coefficient in the second time frame, and so on, from the first processor. The general input signal, $n$, to the second processor is the nth coefficient in the nth time frame from the first processor. The output signals from the first processor, whether in serial or parallel form, must be stored over successive time frames in order to provide the input signals to the second processor. The first complete set of input signals to the second processor is not available until $n$ time frames have been sampled by the first processor.

Heretofore, a memory having $n^2$ storage locations has been used to store the output signals from the first processor for reordering as input signals to the second processor. The invention described herein discloses a reordering memory system using only the minimum required memory size of $n(n-1)/2$ storage locations.

BRIEF SUMMARY OF THE INVENTION

In a system for coupling two processors wherein the data from the first processor is stored according to one schema and the data to the second processor is to be retrieved according to another schema, a first memory is provided for storing the output data from the first processor. A second memory stores a list of addresses corresponding to the other schema in the first memory. In response to timing signals, successive addresses from the second memory are extracted and added to counter values to produce successive addresses from which the data is extracted from the first memory and coupled to the second processor.

BRIEF DESCRIPTION OF THE DRAWINGS

FIG. 3 is a detailed block diagram of a preferred embodiment of the invention.

DETAILED DESCRIPTION OF THE PREFERRED EMBODIMENT

Figure 1:
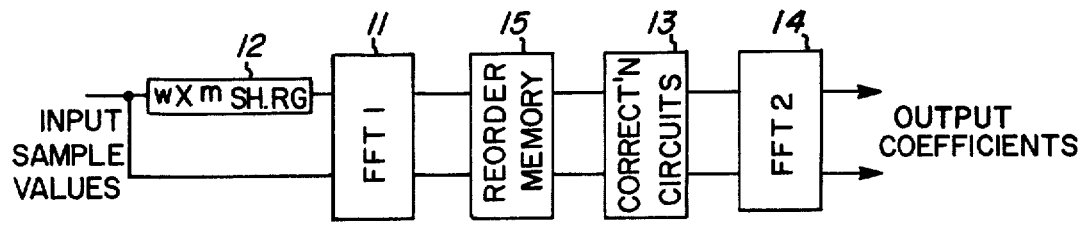
FIG. 1 is a block diagram of a system in which the invention is useful.

FIG. 1 illustrates a system in which the invention described herein would be useful. A first FFT processor 11 is used to process successive input samples. The input samples are complex numbers derived from sampled time domain signals to be analyzed. The analysis of the input data is performed in accordance with the well known butterfly diagram of the Cooley-Turkey Fast Fourier Transform algorithm. Accordingly, for 2m sample points, the first m input samples must be stored before processing in the FFT processor 11 can begin. A shift register 12, capable of storing $m$ data points, comprises $w$ parallel shift registers, each of which is $m$ bits long. The value of $w$ is equal to the number of bits in a word. For purposes of illustration, the FFT processors 11 and 14 can be radix-two floating point FFT processors such as described in U.S. Pat. No. 3,800,130. For eight bit mantissas, the value of $w$ in a floating point system is 22, i.e., the real and imaginary values each comprise eight information bits plus sign bits with a common four bit exponent.

In FIG. 1, when the first sample reaches the FFT processor 11 from the shift register 12, the $(m+1)-th$ sample is available at the other input to the processor 11. The FFT processor 11 processes the information serially and generates successive output signals which are stored in a reorder memory 15.

Each sample group of $2m$ input samples is referred to as a time frame. Successive time frame samples are processed by the FFT processor 11 and stored in the reorder memory 15. For applications such as the processing of a step transform, described in more detail in application Ser. No. 357,198 filed May 4, 1973, now abandoned, but shown in continuation application Ser. No. 525,444 filed Nov. 20, 1970, assigned to the same assignee, the signals from the reorder memory 15 are read out in a diagonal sequence for further processing by a second FFT processor 14. Correction circuits 13 can be provided for various purposes such as quadratic phase correction as explained in the above-referenced application. The output signals from the second FFT processor 14 are further processed in accordance with whatever procedure desired.

The above description serves merely as background for the use of the invention which is embodied in the reorder memory 15 of FIG. 1. Table I illustrates a generalized array of samples stored in an $m^2$ memory. Column numbers represent time frames and row numbers represent samples. The samples are stored by column until $m^2$ samples have been stored. In general, the $j$-th sample in the $k$-th time frame is stored in location $(k-1)m+j$. When $m^2$ samples have been stored, the first diagonal can be extracted and contains the samples stored at the locations 1, $m+2$, $2m+3$, ..., $(k-1)m+k$, ..., $(m-1)m-1$, $m^2$.

The samples stored beneath the diagonal of Table I are not required for processing by the second processor. Eliminating the storage locations for the unused data words results in a required storage of $m(m+1)/2$ locations. The first diagonal, however, can be read out at the time the last data point, $m^2$, is available. Gating the data point $m^2$ directly to the second processor as the other samples are read from memory results in a minimum memory size of $m(m-1)/2$.

TABLE I

| Sample Number | Generalized Array Time Frame Number | | | | | | |
|---|---|---|---|---|---|---|---|
| | 1 | 2 | 3 | ... k ... | m−1 | m | |
| 1 | 1 | m+1 | 2m+1 | ... (k−1)m+1 ... | (m−2)m+1 | (m−1)m+1 | |
| 2 | 2 | m+2 | 2m+2 | ... (k−1)m+2 ... | (m−2)m+2 | (m−1)m+2 | |
| 3 | 3 | m+3 | 2m+3 | ... (k−1)m+3 ... | (m−2)m+3 | (m−1)m+3 | |
| . | . | . | . | | . | . | |
| j | j | m+j | 2m+j | ... (k−1)m+j ... | (m−2)m+j | (m−1)m+j | |
| . | . | . | . | | . | . | |
| m−1 | m−1 | 2m−1 | 3m−1 | ... km−1 ... | (m−1)m−1 | $m^2-1$ | |
| m | m | 2m | 3m | ... km ... | (m−1)m | $m^2$ | |

Figure 2:
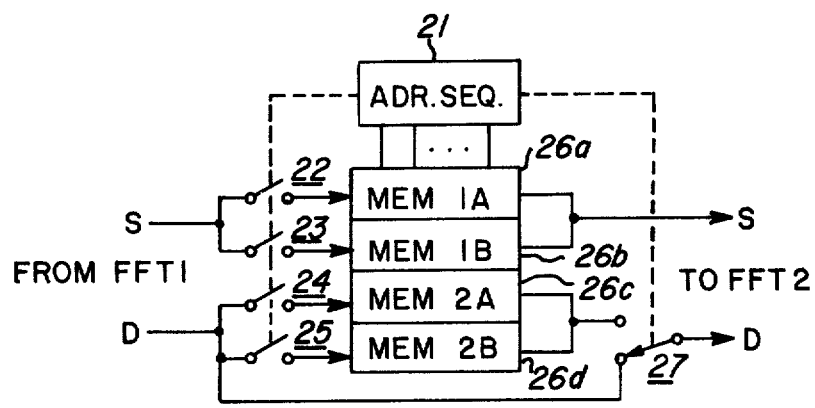
FIG. 2 is a block diagram of a multiplexed memory system embodiment of the invention.

As shown in FIG. 2, the reorder memory can be implemented as multiplexed submemory systems. This arrangement has the advantage of faster operation since retrieval and storage cycles can be executed simultaneously in different memory subsystems. Although a multiplexed system will be described in detail, it is understood that the same principle can be applied to a single memory which results in a simpler but slower system. The explanation of a multiplexed memory system will make clear the implementation of a single memory system.

In FIG. 2, the memory subsystems 26a–26d are arranged with input switches 22–25 controlled by an address sequencer 21 so that the input data to the 1A and 1B memories 26a and 26b are coupled alternately to the S-input signals. The memories 2A and 2B are alternately coupled to the D-input signals. The S-input signals refer to the output signals from the adder and the D-input signals refer to the output signals from the subtractor in the FFT processor 11 (FIG. 1). The S- and D-input signals are provided simultaneously from a radix-2 FFT processor as described in the aforementioned patent. The address sequencer 21 provides addresses to the memories 26a–26d including read/write and timing signals.

The address sequencer 21 closes switches 22 and 24 while switches 23 and 25 remain open. When the data has been stored, the switches 23 and 25 are closed while switches 22 and 24 are open. The output signals from the 1A and 1B memories 26a and 26b can be wire-Ored or otherwise coupled together to provide the S-output signals. The output signals from the 2A and 2B memories 26c and 26d are similarly coupled. A switch 27 is provided to couple the D-output signal to the memory or to the D-input signal under control of the address sequencer 21. The switch 27 is usually in a position to couple the D-output signals from the memory, but when the last data word, $m^2$, is available, the switch 27 couples the D-output signal to the D-input signal to bypass the memory. This eliminates the time required to write (and subsequently to read) the last data point by coupling it directly to the following processor. This will result in the minimum memory size.

The address sequence or schema in which successive samples are stored in the memory 26 can be sequentially arranged during storage in the memory and the retrieval addresses provided by the address sequencer 21 in the desired retrieval schema sequence. Alternatively, the data can be retrieved from the memory from sequential locations and stored in the memory in the order that will provide a diagonal retrieval. Therefore, the reordering can be done during either the storage or the retrieval cycle. In the detailed system to be described, the reordering is performed during the storage cycle so that the retrieval addresses are sequential.

Table II shows the storage of coefficients from the first processor in multiplexed memories. (The coefficient numbers are zero-indexed). The input locations refer to S- and D-signals during times $t_1$ through $t_4$. Alternate times correspond to alternate memories. The circled numbers are those comprisng the first output diagonal. Successive output signals do not appear on the same diagonal. This is a factor that must be taken into account when storing the data for sequential diagonal retrieval.

Figure 4:
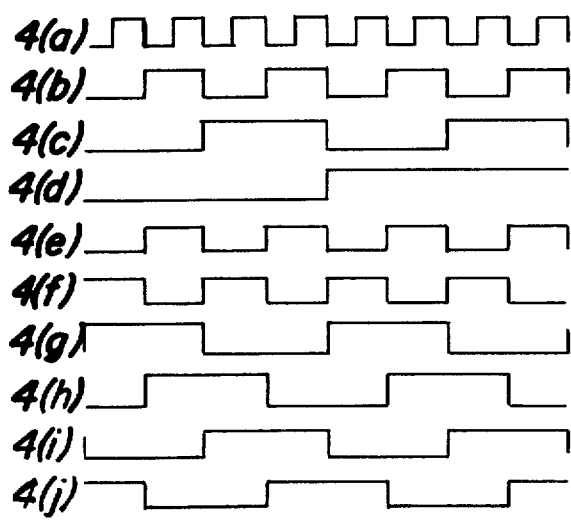
FIG. 4 is a timing diagram associated with various signals in the circuit of FIG. 3.

A detailed multiplex reordering random access memory system is shown in FIG. 3. FIG. 4 illustrates waveforms at various points in the circuit or FIG. 3.

Table II

| Input Location | Unordered Radix-2 FFT Output Time Frame Number | | | | | | | |
|---|---|---|---|---|---|---|---|---|
| | 1 | 2 | 3 | 4 | 5 | 6 | 7 | 8 |
| S-t1 | (0) | 8 | 16 | 24 | 32 | 40 | 48 | 56 |
| S-t2 | 2 | 10 | (18) | 26 | 34 | 42 | 50 | 58 |
| S-t3 | 1 | (9) | 17 | 25 | 33 | 41 | 49 | 57 |
| S-t4 | 3 | 11 | 19 | (27) | 35 | 43 | 51 | 59 |
| D-t1 | 4 | 12 | 20 | 28 | (36) | 44 | 52 | 60 |
| D-t2 | 6 | 14 | 22 | 30 | 38 | (46) | (54) | 62 |
| D-t3 | 5 | 13 | 21 | 29 | 37 | (45) | 53 | (61) |
| D-t4 | 7 | 15 | 23 | 31 | 39 | 47 | 55 | (63) |

A detailed multiplex reordering random access memory system is shown in FIG. 3. FIG. 4 illustrates waveforms at various points in the circuit of FIG. 3.

The memory of the system is divided into four submemory systems, each of which is divided into a first (S) and second (D) memory. The memory system 31 is used to store the S-input signals and is divided into four submemory systems 31a–31d. The memory system 32 stores the D-signals and is divided into four memory subsystems 32a–32d. The 1A memory 31a and 31b are divided into X and Y submemories as are the 1B memory subsystems 31c and 31d and those of the memory subsystems 2A and 2B. The number of bits per word, denoted by w, determines the number of parallel memory units required and the number of sample points, denoted by 2m, determine the number of cascaded memories required. The memories can be constructed from commercially available memory integrated circuits such as an SN74200 (Texas Instruments, Inc.). In the example where 22 bits are required for each word, 22 of the above integrated circuits would be required to store 256 data words. This would be equivalent to a 16 × 16 array for storing 22 coefficients. That is, 22 is the largest integer $m$ for which $m(m-1)/2$ is not greater than 256. The above-mentioned circuits can be coupled in parallel to provide multiples of 256 storage locations as described in the application notes therefor.

The second memory 32 requires only half the number of storage locations as the first memory 31 because most of the discarded data, i.e., $m(m-1)/2$ initial input words, are from the subtractor of the first FFT processor. Commercially available memories are usually available only in sizes that are integral powers of two. That is, the number of storage locations is given by $2^i$, where $i$ is an integer. The minimum memory size as noted above is given by $m(m-1)/2$. The equation $m(m-1)/2 = 2^i$ has an integer solution only for the trivial case where $i=0$ and $m=2$. Since $2^i \geq m(m-1)/2$, then $i \geq [\log_2 m + \log_2 (m-1)] - 1$. Therefore, in the example where 64 data points are sampled, $m = 32$ and $i \geq 8.9542$ or, for the next higher integer, $i = 9$. Thus, 512 locations will be provided even though the minimum number requied is 496.

The use of a multiplexed memory will require only $2^8$ locations in the second memory for the reasons explained above. The locations in second memory will, however, be cycled twice as often as those in the first memory.

The memory system illustrated in FIG. 3 will, for purposes of illustration, be understood to comprise 512 locations in each of the first memory subsystems 31a-31d and 256 locations in each of the second memory subsystems 32a-32d. The addresses supplied by four address multiplexors 34a-34d are each nine bits wide, but the second memory subsystems 32a-32d utilize only eight of the bits, disregardng the most significant bit. Therefore, the storage locations in the second memory 32 will be accessed twice as often as the locations in the first memory 31.

The basic timing is derived from an oscillator 36 which has a frequency equal to the data rate. Because of the memory multiplexing, the memory systems are driven at half the data rate thereby permitting fast data rates with slow speed commercially available memory circuits.

The oscillator 36 drives a counter 37. The counter 37 can be a simple, state-of-the-art, nine-bit ripple counter which is well-known in the art and need not be described in detail.

The read addresses can be taken directly from the output signals of the counter 37 since it was noted above that the illustrated embodiment retrieves the data in sequential locations and the reordering is performed during the storage cycles.

The input data signal rate is matched to the memory rate by input circuits which hold the input data over the interval of time required to store them in the memory. The circuit illustrated in FIG. 3 uses D-type flip-flops for the data input storage. The input flip-flops 33a and 33b each comprise $w$ flip-flops in parallel—where $w$ is the number of bits in each word—which are clocked at half the data rate. The input circuit 33c for the secondary memory 32 is the same as that shown in detail for the first memory 31.

The input clocking signals LDX and LDY are actually complementary signals since the data to the X and Y halves of the memories are alternately loaded. Therefore, the LDX aND LDY signals can be taken from the least significant bit (LSB) output signal from the counter 37 since that bit will be changing at half the clock rate and therefore at half the data rate. The LDY signal is taken directly from the LSB of the counter 37 and the LDX signal, from an inverter 39 which coupled to the LSB of the counter 37. The LDY signal is coupled as the control signal to a pair of multiplexors 35a and 35b to select the correct memory output signals.

An enable signal is required by the memory subsystems. In the SN74200 circuit, the enable signal is actually three signals coupled to the inputs of an AND gate so that address decoding can be performed with three of the address bits. For purposes of the illustrated embodiment, the three enable signals of each memory system are coupled together. The enable signal for the X memories 31a, 31c, 32a, and 32c is the LDY signal and that for the Y memories 31b, 31d, 32b and 32d is the LDX signal.

Each SN74200 circuit also requires a Write Enable signal which, in the illustrated embodiment, is the R/W signal. The R/WAX signal is coupled as the Write Enable signal of the AX memory subsystems 31a and 32a. The Write Enable signals for the other memory subsystems are the R/WAY signal for the AY memory subsystems 31b and 32b, the R/WBX signal for the BX subsystems 31c and 32c, and the R/WBY signal for the BY subsystems 31d and 32d.

The R/W signal used for each memory subsystem's Write Enable signal is also coupled to the address signal multiplexor 34a-34d providng the address to the associated memory subsystem. The AX multiplexor 34a provides the address to the AX memory subsystems 31a and 32a; the AY multiplexor 34b, to the AY memory subsystems 31b and 32b; and so on.

The R/WAX signal is taken from an inverter 38, the input of which is coupled to the second LSB ($2^1$) of the counter 37. The R/WBX signal is coupled directly to the second LSB of the counter 37. The R/WAY signal is the Exclusive-OR function of the LSB and the second LSB ($2^0$ and $2^1$) of the counter 37 and R/WBY is its complement. These signals are shown as generated by an Exclusive-OR-NOR gate 310.

The read addresses are supplied directly from the output signals of the counter 37. The counter bits are coupled directly to the multiplexors 34a and 34b for coupling to the AX memory subsystems 31a and 32a and to the AY memory subsystems 31b and 32b, respectively. Because the counter value will change before the B systems have completed their cycles at the given address, a latch 315 is supplied to hold the addresses between successive cycles. The latch 315 can simply be nine parallel D-type flip-flops with a common clock signal, R/WAY, for storing each of the counter bits. Commercially available integrated circuits such as an SN74174 (Texas Instruments, Inc.) (six D-type flip-flops) and an SN74175 (four D-type flip-flops) can be used to implement the latch 315.

The multiplexors 34a-34d and 35a-35d can be implemented from AND-OR gate combinations in a way which is well known in the art. Alternatively, commercially available integrated circuits such as an SN74157 (Texas Instruments, Inc.) can be used. The SN74157 circuit provides four output signals so three ciuits must be used for each of the multiplexors 34a and 34b whereas only two will be needed for each of the multiplexors 34c and 34d. The input connections are made so that when the select signal (R/W signal) is low, the read addresses are coupled to the memory address lines and when the select signal is high, the write addresses are coupled to the memories. The strobe line used with the above-identified commercially available circuits can be coupled to ground or logical zero as it is not required in this circuit.

The multiplexors 35a and 35b can be constructed from the same circuit as the other multiplexors except that eleven such circuits will be required for two output cables of 22 bits each. The select signal is coupled so that the X memories are gated while LDY is high and the Y memories, when it is low.

The generation of the write addresses is more complicated than the read addresses because the reordering is performed during the write cycle. Table III illustrates a portion of an effective write addressing scheme for the example of a 64 sample point FFT system. Note that the S- and D-signals are stored together so that each time frame comprises only 32 sample times. The first column shows the sample time within a given time frame. The next two columns are the respective S- and D-signals derived during the corresponding sample time. The fourth column shows in which memory subsystem the samples are stored and the fifth column shows the read address from which they are retrieved. The remaining columns indicate the write addresses at which they are stored for a unit slope diagonal. The input signals occur in bit-reversed sequence. The AX write addresses will be described in more detail below. The AY write addresses are the AX addresses plus 128 since there are eight coefficients per 64 point FFT time frame in the AY memory and 8 × 16 or 128 addresses must be passed before obtaining the desired coefficient which occurs for the next coefficient in the diagonal being written.

Similarly, the BX Write addresses are the AX addresses plus 64 and the BY, AX plus 192. The additions shown are understood to be modulo-512 for first memory 31 and modulo-256 for the second memory 32. The modulo additions are accomplished by discarding the high order carries from the ninth bit position. In Table III, the write address for the eighth sample time in the second diagonal is shown as two numbers. The address in parenthesis is that of the D-input signal since 162 is 418 mod 256.

The AX addresses must be determined to reorder the data in the memory. Table IV shows the AX addresses and other values for various samples sizes. As shown, the AX addresses in the first diagonal for the example being discussed are 1, 34, 19, and so on. Subsequent diagonals are determined by adding eight as shown in Table III.

Table IV

| Sample Number | Write Address Sequences (AX) Number of Stages (FFT1–FFT2) | | | | |
|---|---|---|---|---|---|
| | 4–4 | 4–5 | 5–5 | 5–6 | 6–6 |
| 1 | 1 | 1 | 1 | 1 | 1 |
| 2 | 4 | 6 | 10 | 18 | 34 |
| 3 | 3 | 3 | 7 | 11 | 19 |
| 4 | 6 | 8 | 16 | 28 | 52 |
| 5 | 5 | 5 | 5 | 5 | 13 |
| 6 | 8 | 10 | 14 | 22 | 46 |
| 7 | 7 | 7 | 11 | 15 | 31 |
| 8 | 10 | 12 | 20 | 32 | 64 |
| AY=AX+ | 8 | 16 | 32 | 64 | 128 |
| BX=AX+ | 4 | 8 | 16 | 32 | 64 |
| BY=AX+ | 12 | 24 | 48 | 96 | 192 |
| DIAG. | 4 | 2 | 2 | 1 | 1 |
| SEQUENCE ADDRESS BITS | 5 | 6 | 7 | 8 | 9 |

The illustrated embodiment uses a Read Only Memory (ROM) 311 for storing the AX address increments. The three low order bits from the counter 37 address the decoder, or address register, of the ROM 311 to read out the six bits specifying the corresponding AX increment. The increment from the ROM data register is added to the value of the counter to derive the AX address by means of an adder 312. Such adders are well known and are commercially available; see, for example, SN7483 (Texas Instruments, Inc.).

A latch circuit 313, such as previously described, is used to store the output value from the adder 312 because the counter values will change before the memory subsystems have completed their cycles. The output signals from the latch 313 are used directly as the write address for the AX memory subsystems. The AY write address is calculated by adding the constant 128 by means of an adder 314. The BX address is calculated from the AX address by adding a constant 64 in an adder 316 and the BY address, by adding a constant 192 in an adder 317.

Three other input bits to the ROM 311 are shown from a control circuit 318 which also supplies the constants added to the AX address to obtain the other addresses. For purposes of a unit slope diagonal, the three address bits from the control circuit 318 can be considered to be all zeroes and the constants to be as described above. The address of the ROM 311 is therefore determined by the three least significant bits of the counter 37. The control circuit 318, which can be implemented as a plurality of switches, is used for chang- Table III

| | Write Addresses For 64 Sample Points | | | | | | |
|---|---|---|---|---|---|---|---|
| | Input Signals | | | Read | Write Address Sequence | | |
| Sample Time | S | D | Memory Subsys | Memory Addr | 1st Diag | 2nd Diag | Nth Diag ... |
| 1 | 0 | 32 | AX | 1 | 1 | 9 | 8(N−1)+1 |
| 2 | 16 | 48 | AY | 1 | 129 | 137 | 8(N−1)+129 |
| 3 | 8 | 40 | BX | 1 | 65 | 73 | 8(N−1)+65 |
| 4 | 24 | 56 | BY | 1 | 193 | 201 | 8(N−1)+193 |
| 5 | 4 | 36 | AX | 2 | 34 | 42 | 8(N−1)+34 |
| 6 | 20 | 52 | AY | 2 | 162 | 204 | 8(N−1)+162 |
| 7 | 12 | 44 | BX | 2 | 98 | 106 | 8(N−1)+98 |
| 8 | 28 | 60 | BY | 2 | 226 | 418 (162) | 8(N−1)+226 |
| 9 | 2 | 34 | AX | 3 | 19 | 27 | 8(N−1)+19 |
| . | . | . | . | . | . | . | . |
| 29 | 7 | 39 | AX | 8 | 64 | 72 | 8(N−1)+64 |
| 30 | 23 | 55 | AY | 8 | 192 | 200 | 8(N−1)+192 |
| 31 | 15 | 47 | BX | 8 | 128 | 136 | 8(N−1)+128 |
| 32 | 31 | 63 | BY | 8 | 256 | 264 | 8(N−1)+256 | ing the slope of the diagonal read from the memory which requires only that a new sequence of AX increments be used and the constants adjusted accordngly. A change in memory size can also be made for different configurations as shown in Table IV.

The waveshapes of various signals from FIG. 3 are shown in FIG. 4. The clock oscillator 36 output signals are shown in FIG. 4(a). The LSB signals from the counter are shown in FIG. 4(b); from the second LSB bit, in FIG. 4(c); and from the third LSB, in FIG. 4(d). These last three bits form the address of the ROM 311. The LDY signal is shown in FIG. 4(e) and coincides with the LSB signal of the counter 37, FIG. 4(b). The LDX signal is illustrated in FIG. 4(f). The R/WAX, R/WAY, R/WBX and R/WBY signals are shown in FIGS. 4(g) through 4(j), respectively.

The embodiment shown and described in FIG. 3 does not show the gating necessary for bypassing the memory during the last sample time of each time frame as is illustrated in FIG. 2. Such an addition would be within the skill of the art by using a set of w AND gates, all of which are gated by the m-th count decoded from the counter 37 by another AND gate and the resulting signals coupled to the D-output signals from the multiplexor 35b by means of w OR gates. For purposes of clarity and since it is within the skill of the art to construct it from the above description, this facility was not included in the circuit of FIG. 3.

Although described for cascaded processors, it is clear to one of ordinary skill in the art that the second processor can actually be the first processor. In applications such as vector and matrix processing, the output signals from the first processor can be reprocessed by the first processor in the way described above. Such systems would be slower but less complex than the illustrated embodiment.

Various modifications to the systems and circuits described and illustrated to explain the concepts of and modes of practicing the invention might be made by those of ordinary skill in the art within the principle or scope of the invention as expressed in the appended claims.

What is claimed is:

1. In a system for coupling output signals from a first processor to the input means of a second processor wherein the input signals to said second processor are represented by a different schema from the schema of the output signals from said first processor, the improvement comprisng:

first memory means for storing the output signals from said first processor, said first memory means having data input means, data output means, and addressing means;

second memory means for storing signals specifying a first group of first memory addresses corresponding to the schema of input signals to said second processor, said second memory having addressing means and output means;

timing signal means for producing a plurality of signals in time sequence representing successive binary numbers;

means for coupling said timing signals to the addressing means of said first memory means as a first address;

means for coupling a subset of said timing signals to the addressing means of said second memory means;

first adder means responsive to said output means of said second memory and to said timing signals for producing sum output signals;

means for coupling said sum output signals from said first adder means to the addressing means of said first memory means as a second address;

means responsive to said timing signals for storing data in said first memory means at one of said addresses and for retrieving data from said first memory means at the other of said addresses;

means for coupling the output signals from said first processor to the data input means of said first memory means; and means for coupling the data output means from said first memory means to the input means of said second processor.

2. The invention claimed in claim 1 wherein said first memory means comprises a plurality of submemory means, each having input means, output means, and addressing means;

means for producing signals representative of constants; and further adder means responsive to said constants signals and the sum signals from said first adder means for producing second address signals to said submemory systems.

3. The invention as claimed in claim 2 further including control means for altering the address to said second memory whereby said data is coupled to said secondary processor according to another schema.

* * * * *